US012593250B2

(12) United States Patent (10) Patent No.: US 12,593,250 B2
Ji et al. (45) Date of Patent: Mar. 31, 2026

(54) SIDELINK TRANSMISSION CONTROL METHOD, TRANSMIT TERMINAL, AND RECEIVE TERMINAL

(71) Applicant: VIVO MOBILE COMMUNICATION CO., LTD., Guangdong (CN)

(72) Inventors: Zichao Ji, Guangdong (CN); Shuyan Peng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 786 days.

(21) Appl. No.: 17/875,313

(22) Filed: Jul. 27, 2022

(65) Prior Publication Data

US 2022/0369169 A1 Nov. 17, 2022

Related U.S. Application Data

(63) Continuation of application No. PCT/CN2021/076039, filed on Feb. 8, 2021.

(30) Foreign Application Priority Data

Feb. 14, 2020 (CN) .......................... 202010095210.9

(51) Int. Cl.
*H04W 28/26* (2009.01)
(52) U.S. Cl.
CPC .................................. *H04W 28/26* (2013.01)
(58) Field of Classification Search
CPC ............................................... H04W 28/26
USPC ........................................................ 370/329
See application file for complete search history.

(56) References Cited

U.S. PATENT DOCUMENTS

| | | | |
|---|---|---|---|
| 2016/0021566 A1 | 1/2016 | Kimura et al. | |
| 2018/0359787 A1 | 12/2018 | Lee et al. | |
| 2019/0289615 A1 | 9/2019 | Lee et al. | |
| 2019/0313405 A1 | 10/2019 | Li et al. | |
| 2020/0068609 A1* | 2/2020 | Wang .................... | H04W 72/02 |
| 2020/0092692 A1 | 3/2020 | Wang et al. | |
| 2021/0105104 A1* | 4/2021 | Cao ....................... | H04L 1/1854 |
| 2022/0014325 A1 | 1/2022 | Zhao | |

FOREIGN PATENT DOCUMENTS

| | | |
|---|---|---|
| CN | 102412950 A | 4/2012 |
| CN | 106792885 A | 5/2017 |
| CN | 107666681 A | 2/2018 |
| CN | 107682930 A | 2/2018 |

(Continued)

OTHER PUBLICATIONS

R1-165263 (Year: 2016).*

(Continued)

*Primary Examiner* — Intekhaab A Siddiquee
(74) *Attorney, Agent, or Firm* — BROOKS KUSHMAN P.C.

(57) ABSTRACT

A sidelink transmission control method, a transmit terminal, and a receive terminal are provided, where a method of a transmit terminal side includes: determining whether a trigger condition for resource reselection is satisfied; and performing a first operation in a case that the trigger condition for resource reselection is satisfied, where the first operation includes at least one of resource reselection, modulation and coding scheme MCS adjustment, and power adjustment.

19 Claims, 6 Drawing Sheets

(56)     References Cited

FOREIGN PATENT DOCUMENTS

| CN | 108400843 A | 8/2018 | | |
| CN | 108810906 A | 11/2018 | | |
| CN | 108923894 A | 11/2018 | | |
| CN | 109644458 A | 4/2019 | | |
| CN | 110139372 A | 8/2019 | | |
| EP | 3499747 A1 | 6/2019 | | |
| JP | 2019525615 A | 9/2019 | | |
| KR | 20190020152 A | 2/2019 | | |
| WO | 2014167883 A1 | 10/2014 | | |
| WO | 2018021803 A1 | 2/2018 | | |
| WO | WO-2020173655 A1 * | 9/2020 | ............. | H04L 5/003 |
| WO | WO-2021007686 A1 * | 1/2021 | ........... | H04B 17/318 |

OTHER PUBLICATIONS

First Office Action for Japanese Application No. 2022-549127, dated Aug. 25, 2023, 7 Pages.

Ericsson "Resource Reselection" 3GPP TSG RAN WG1 Meeting #85, Nanjing, People's Republic of China, May 2016, R1-165263, 6 Pages.

CMCC "Discussion on sidelink resource allocation mechanism" 3GPP TSG RAN WG1 #97, Reno, USA, May 2019, R1-1906515, 4 Pages.

Vivo "Physical layer procedure for NR sidelink" 3GPP TSG RAN WG1 Meeting #99, Reno, USA, Nov. 2019, R1-1912026, 19 Pages.

First Office Action for Chinese Application No. 202010095210.9, dated Aug. 19, 2022, 12 Pages.

International Search Report and Written Opinion for Application No. PCT/CN2021/076039, dated Apr. 29, 2021, 8 Pages.

First Office Action for Korean Application No. 10-2022-7031169, dated Dec. 20, 2024, 9 Pages.

Second Office Action for Chinese Application No. 202010095210.9, dated Feb. 22, 2023, 11 Pages.

Beijing Xinwei Telecom Techn. Discussion on V2V Semi-Persistent Scheduling procedure. 3GPP TSG RAN WG1 Meeting #84bis. R1-163154. Online. Apr. 2016. 8 pages.

Second Korean Office Action for Korean Patent Application No. 10-2022-7031169 mailed Aug. 29, 2025. 18 pages.

* cited by examiner

Receive terminal

12

11

Transmit terminal

UE-B

UE-C

UE-A

UE-B

UE-C

UE-A

UE-B     UE-C t

SIDELINK TRANSMISSION CONTROL METHOD, TRANSMIT TERMINAL, AND RECEIVE TERMINAL

CROSS-REFERENCE TO RELATED APPLICATIONS

This application is a continuation of International Application No. PCT/CN2021/076039 filed on Feb. 8, 2021, which claims priority to Chinese Patent Application No. 202010095210.9, filed on Feb. 14, 2020, which are incorporated herein by reference in their entireties.

TECHNICAL FIELD

The present invention relates to the field of communications technologies, and in particular, to a sidelink transmission control method, a transmit terminal, and a receive terminal.

BACKGROUND

In sidelink (SL), terminals may autonomously select transmission resources based on channel monitoring. Due to inaccuracy of channel monitoring results of the terminals and randomness of resource selection of the terminals, transmission resources selected by a plurality of transmit terminals (TX UE) may collide, and consequently a receive terminal (RX UE) cannot demodulate signals of the TX UEs.

SUMMARY

According to a first aspect, an embodiment of the present invention provides a sidelink transmission control method, applied to a transmit terminal and including:

determining whether a trigger condition for resource reselection is satisfied; and performing a first operation in a case that the trigger condition for resource reselection is satisfied, where the first operation includes at least one of resource reselection, modulation and coding scheme MCS adjustment, and power adjustment.

According to a second aspect, an embodiment of the present invention provides a sidelink transmission control method, applied to a receive terminal and including:

determining, based on a channel monitoring result, whether there is a resource conflict for a resource of a first transmit terminal; and in a case that there is a resource conflict for the resource of the first transmit terminal, sending a first message to the first transmit terminal, where the first message includes at least one of resource conflict information and resource reselection trigger information.

According to a third aspect, an embodiment of the present invention provides a transmit terminal, including:

a judgment module, configured to determine whether a trigger condition for resource reselection is satisfied; and an execution module, configured to perform a first operation in a case that the trigger condition for resource reselection is satisfied, where the first operation includes at least one of resource reselection, modulation and coding scheme MCS adjustment, and power adjustment.

According to a fourth aspect, an embodiment of the present invention provides a receive terminal, including:

a judgment module, configured to determine, based on a channel monitoring result, whether there is a resource conflict for a resource of a first transmit terminal; and a sending module, configured to: in a case that there is a resource conflict for the resource of the first transmit terminal, send a first message to the first transmit terminal, where the first message includes at least one of resource conflict information and resource reselection trigger information.

According to a fifth aspect, an embodiment of the present invention provides a transmit terminal, including a memory, a processor, and a computer program stored in the memory and capable of running on the processor, where when the computer program is executed by the processor, the steps of the sidelink transmission control method according to the first aspect in the embodiments of the present invention are implemented.

According to a sixth aspect, an embodiment of the present invention provides a receive terminal, including a memory, a processor, and a computer program stored in the memory and capable of running on the processor, where when the computer program is executed by the processor, the steps of the sidelink transmission control method according to the second aspect in the embodiments of the present invention are implemented.

According to a seventh aspect, an embodiment of the present invention further provides a computer-readable storage medium, where a computer program is stored in the computer-readable storage medium. When the computer program is executed by a processor, the steps of the sidelink transmission control method according to the first aspect in the embodiments of the present invention are implemented.

According to an eighth aspect, an embodiment of the present invention further provides a computer-readable storage medium, where a computer program is stored in the computer-readable storage medium. When the computer program is executed by a processor, the steps of the sidelink transmission control method according to the second aspect in the embodiments of the present invention are implemented.

According to a ninth aspect, an embodiment of the present invention provides a computer software product, where the computer software product is stored in a non-volatile storage medium, and when the software product is executed by at least one processor, the steps of the sidelink transmission control method according to the first aspect in the embodiments of the present invention are implemented, or the steps of the sidelink transmission control method according to the second aspect in the embodiments of the present invention are implemented.

According to a tenth aspect, an embodiment of the present invention provides an electronic device, where the electronic device is configured to perform the sidelink transmission control method according to the first aspect of the embodiments of the present invention, or perform the sidelink transmission control method according to the second aspect of the embodiments of the present invention.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention shall fall within the protection scope of the present invention.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of the present invention, the terms "an example" or "for example" are used to represent an example, an illustration, or a description. Any embodiment or design scheme described as "an example" or "for example" in the embodiments of the present invention should not be construed as being more preferred or advantageous than other embodiments or design schemes. To be precise, the words such as "an example" or "for example" are intended to present a related concept in a specific manner.

The following describes the embodiments of the present invention with reference to the accompanying drawings. The embodiments provided by the present invention may be applied to a wireless communications system. The wireless communications system may be a fifth-generation ($5^{th}$ generation, 5G) system, or an evolved long term evolution (eLTE) system, or a later evolved communications system.

Figure 1:
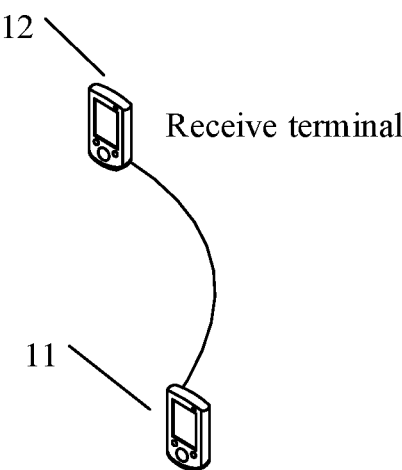
FIG. 1 is a structural diagram of a network system according to an embodiment of the present invention.

FIG. 1 is a structural diagram of a network system according to an embodiment of the present invention. As shown in FIG. 1, the network system includes a transmit terminal 11 and a receive terminal 12. The transmit terminal 11 may be TX UE or a transmit node, and the transmit terminal 11 may be a mobile communications device, such as an in-vehicle terminal, a mobile phone, a tablet computer (Tablet Personal Computer), a laptop computer, a personal digital assistant (PDA), a mobile internet device (MID), or a wearable device. It should be noted that a specific type of the transmit terminal 11 is not limited in the embodiments of the present invention. The receive terminal 12 may be also referred to as RX UE or a receive node. The receive terminal 12 may be a mobile communications device, for example, may be an in-vehicle terminal, a mobile phone, a tablet computer (Tablet Personal Computer), a laptop computer, a personal digital assistant (PDA), a mobile Internet device (MID), or a wearable device. It should be noted that a specific type of the receive terminal 12 is not limited in the embodiments of the present invention.

The network system provided by the embodiments of the present invention is an SL network system, and the SL may be referred to as a sidelink, a secondary link, a side-link, a side link, a direct communication link, or the like.

Figure 2:
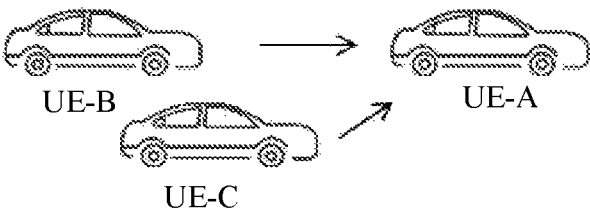
FIG. 2 is a schematic structural diagram of an Internet of vehicles system according to an embodiment of the present invention.

In the SL network system, one RX UE may perform SL transmission with at least one TX UE. For example, in NR V2X (Vehicle to everything, Internet of Vehicles) shown in FIG. 2, one RX UE (UE-A) may perform SL transmission with two TX UEs (UE-B and UE-C).

There are mainly two SL resource allocation manners, one is scheduling by a network-side device, and the other is autonomous selection by a terminal. With regard to the resource allocation manner of scheduling by the network-side device, a sidelink resource used by the terminal for data transmission is determined by the network-side device, and is notified to the terminal (for example, TX UE) by using downlink signaling. With regard to the resource allocation manner of autonomous selection by the terminal, the terminal may select an available transmission resource from a configured (or preconfigured) resource pool. The terminal performs channel monitoring (sensing) before resource selection, selects a resource set with less interference based on a channel monitoring result, and then randomly selects, from the selected resource set, a resource for transmission.

With regard to the resource allocation manner of channel monitoring-based autonomous selection by the terminal, due to inaccuracy of channel monitoring results and randomness of resource selection, transmission resources of a plurality of (including two) TX UEs may collide, and consequently the RX UE cannot demodulate signals of the TX UEs. As an example, the following describes two resource conflict scenarios.

Figure 3:
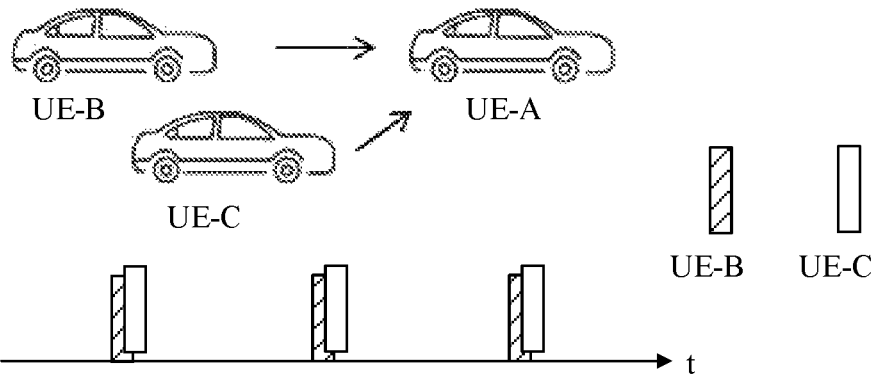
FIG. 3 is a schematic diagram of a resource conflict scenario according to an embodiment of the present invention.

Scenario 1: When the plurality of TX UEs perform periodic data transmission, periodic resources selected by the plurality of TX UEs collide continuously, and consequently the RX UE cannot receive information for a relatively long period of time. For example, in FIG. 3, UE-B and UE-C send periodic data to UE-A, and periodic resources selected by the UE-B continuously collide with periodic resources selected by the UE-C.

Scenario 2: Due to defects of the channel monitoring mechanism, during channel monitoring, the TX UE cannot detect information sent by some other TX UEs and only the RX UE can detect the information sent by those TX UEs. For example, when there is a hidden node, the TX UE cannot detect information sent by the hidden node while only the RX UE can detect information sent by the hidden node. In this case, the TX UE may have a high probability to select a resource occupied by the hidden node, resulting in a resource conflict. For example, in FIG. 4, UE-C is blocked by a building. When UE-B is making resource selection, the UE-B cannot detect a reserved resource of the UE-C due to blocking of the building. As a result, the UE-B may select a same reserved resource, causing a collision between the resources of the UE-B and the UE-C, and consequently UE-A cannot demodulate signals of the UE-B and the UE-C.

In view of this, in order to resolve the problem of a collision between transmission resources in the SL network system, the embodiments of the present invention provide a sidelink transmission control method.

Figures 4, 5:
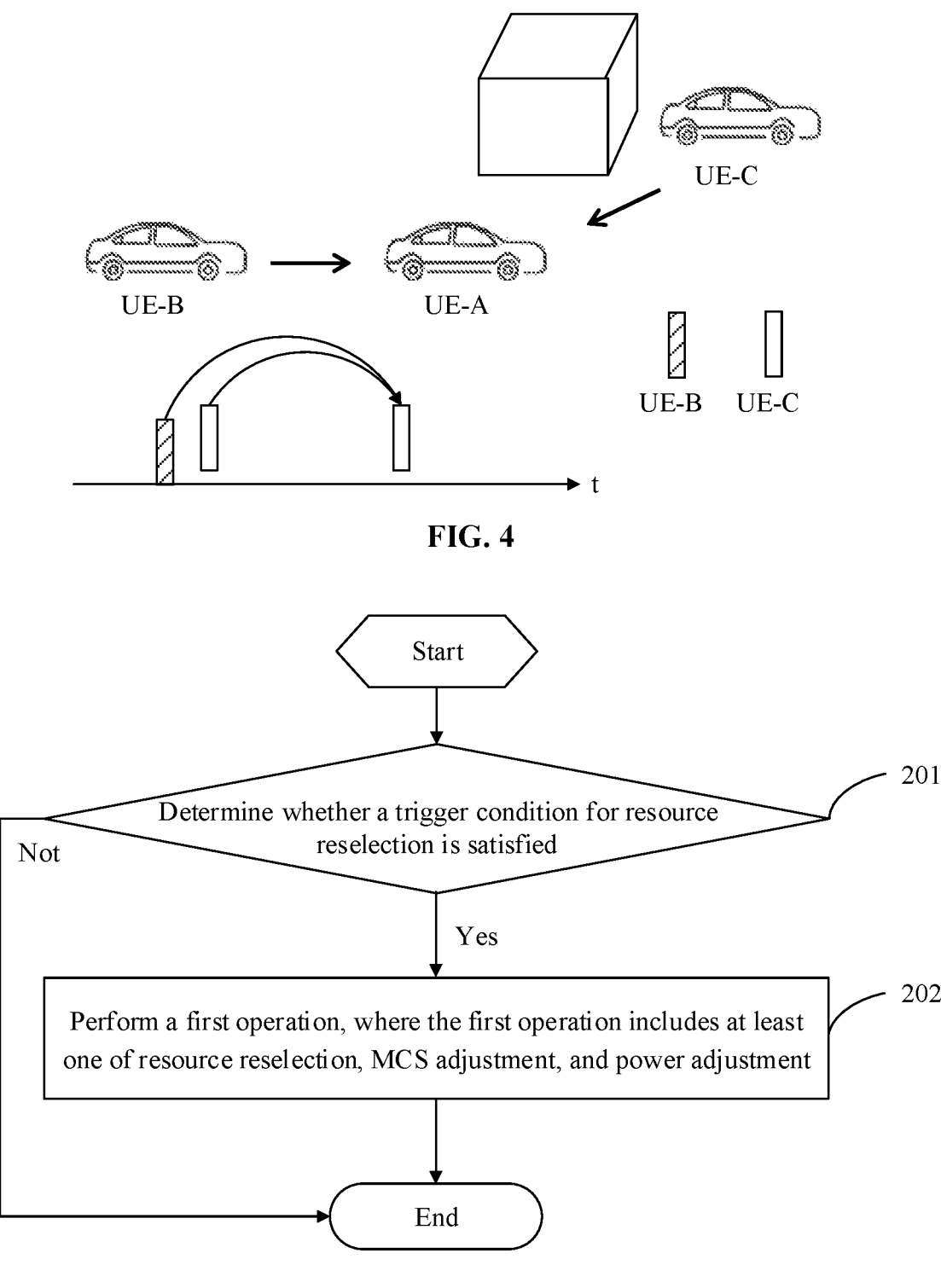
FIG. 4 is a schematic diagram of another resource conflict scenario according to an embodiment of the present invention.
FIG. 5 is a flowchart of a sidelink transmission control method applied to a transmit terminal according to an embodiment of the present invention.

FIG. 5 is a flowchart of a sidelink transmission control method according to an embodiment of the present invention. As shown in FIG. 5, the sidelink transmission control method is applied to a transmit terminal (that is, TX UE), and the method includes the following steps.

Step 201: Determine whether a trigger condition for resource reselection is satisfied.

The trigger condition for resource reselection may be construed as a condition for triggering the transmit terminal to perform resource reselection.

The transmit terminal may perform step 201 in a resource conflict scenario, that is, when detecting a resource conflict or being notified of a resource conflict by other terminals (for example, a receive terminal RX UE), the transmit terminal may determine whether the trigger condition for resource reselection is satisfied.

Step 202: Perform a first operation in a case that the trigger condition for resource reselection is satisfied, where the first operation includes at least one of resource reselection, MCS adjustment, and power adjustment.

The MCS adjustment is modulation and coding scheme adjustment.

In step 202, in a case that it is determined that the trigger condition for resource reselection is satisfied, the transmit terminal may perform an operation of resource reselection, that is, the transmit terminal may perform resource reselection, in other words, the transmit terminal may reselect a resource; or the transmit terminal may perform an operation of MCS adjustment, that is, the transmit terminal may perform MCS adjustment, in other words, the transmit terminal may adjust an MCS; or may perform an operation of power (TX power) adjustment, that is, the transmit terminal may perform power adjustment, in other words, the transmit terminal may adjust a power.

For the resource reselection operation in the foregoing operations, because the transmit terminal reselects the resource to avoid a resource conflict, thereby better resolving the problem of resource conflicts. For the MCS adjustment operation or the power adjustment operation in the foregoing operations, an operation of decreasing an MCS may be performed, or an operation of decreasing a power may be performed. In this way, a code rate of data transmission is reduced by using a lower MCS or a lower power, so that data transmission can be still implemented on a conflict resource. Normal data transmission can be better ensured even if the transmit terminal does not reselect a resource, thereby better resolving the problem that data transmission is affected by resource conflicts.

In step 202, the transmit terminal may perform any one of the foregoing operations, or may perform a plurality of operations in the foregoing operations. The transmit terminal may autonomously decide a to-be-performed operation, or may decide a to-be-performed operation according to a rule predefined by a protocol, or may decide a to-be-performed operation according to a rule configured by a control node, or may decide a to-be-performed operation according to a preconfigured rule.

In step 202, in resources selected by the transmit terminal, if only part of the resources collide, the transmit terminal may perform the first operation on at least the conflict resource.

It should be noted that, in this embodiment of the present invention, in a case that it is determined that the trigger condition for resource reselection is satisfied, the transmit terminal may perform the first operation, or may not perform the first operation. The transmit terminal may autonomously decide whether to perform the first operation, or may decide, according to the rule predefined by the protocol, whether to perform the first operation, and may also decide, according to the preconfigured rule, whether to perform the first operation.

In this embodiment of the present invention, in sidelink communication, when there is a resource conflict for the resource of the transmit terminal, the transmit terminal may perform resource reselection or perform related adjustment in the case that the trigger condition for resource reselection is satisfied. In this way, the transmit terminal can address the problem of resource conflicts through resource reselection or related adjustment, thereby improving reliability and effectiveness of sidelink transmission and ensuring sidelink communication performance.

Optionally, the performing a first operation in a case that the trigger condition for resource reselection is satisfied includes:

in a case that the trigger condition for resource reselection is satisfied, determining whether the receive terminal is located within a valid communication range; and performing the first operation in a case that the receive terminal is located within the valid communication range.

Optionally, in a case that at least one of the following conditions is satisfied, it is determined that the receive terminal is located within the valid communication range:

the transmit terminal has received reverse information from the receive terminal;

a distance between the transmit terminal and the receive terminal is less than or equal to a ninth threshold; and an information transmission energy of the receive terminal is greater than or equal to a tenth threshold.

If the transmit terminal can receive reverse information transmission from the receive terminal, for example, PSCCH, PSSCH, or PSFCH transmission from the RX UE to the TX UE, it may indicate that the receive terminal is located within the valid communication range. If the distance between the transmit terminal and the receive terminal is less than or equal to the ninth threshold, and the ninth threshold may be prescribed by the protocol, configured by the control node, or preconfigured, it may indicate that the receive terminal is located within the valid communication range.

If the information transmission energy of the receive terminal is greater than or equal to the tenth threshold, for example, a parameter such as a reference signal received power (RSRP), a received signal strength indicator (RSSI), a reference signal received quality (RSRQ), or a signal to interference plus noise ratio (SINR), and the tenth threshold may be prescribed by the protocol, configured by the control node, or preconfigured, it may indicate that the receive terminal is located within the valid communication range.

An RSRP, RSSI, RSRQ, or SINR value of the receive terminal may be reported by the receive terminal to the transmit terminal, or may be obtained through measurement by the transmit terminal.

In this implementation, in a case that the trigger condition for resource reselection is satisfied, the transmit terminal may further determine whether the receive terminal is located within the valid communication range, and the transmit terminal performs the first operation only when the transmit terminal determines that the receive terminal is located within the valid communication range.

In this implementation, whether the receive terminal is located within the valid communication range is determined, so as to determine whether the transmit terminal needs to perform the first operation. In the case that the receive terminal is located within the valid communication range, the transmit terminal may perform the first operation to resolve the problem that data transmission is affected by a resource conflict. The transmit terminal may not perform the first operation in a case that the receive terminal is located beyond the valid communication range.

In this embodiment of the present invention, the transmit terminal determines, in a plurality of manners, whether the trigger condition for resource reselection is satisfied. For example, for sidelink transmission (SL transmission) based on hybrid automatic repeat request (HARQ) feedback, the transmit terminal may determine, based on a HARQ feedback status of the receive terminal, whether the trigger condition for resource reselection is satisfied. In other words, for sidelink transmission based on HARQ feedback, the transmit terminal may determine, based on the HARQ feedback status of the receive terminal, whether a resource conflict occurs, so as to determine whether the trigger condition for resource reselection is satisfied. For another example, the receive terminal may determine, based on the channel monitoring result, whether there is a collision for the resource of the transmit terminal. In a case that the receive terminal determines that there is a collision for the resource of the transmit terminal, the receive terminal may send a notification message to the transmit terminal, and the transmit terminal may determine, based on the notification message sent by the receive terminal, whether the trigger condition for resource reselection is satisfied.

The following describes an implementation of determining whether the trigger condition for resource reselection is satisfied in sidelink transmission based on HARQ feedback.

Optionally, the determining whether the trigger condition for resource reselection is satisfied includes:

if sidelink transmission is transmission of N transport blocks (TB) based on HARQ feedback, determining, based on a HARQ feedback status from the receive terminal, whether the trigger condition for resource reselection is satisfied, where N is an integer greater than or equal to 1.

Figure 6:
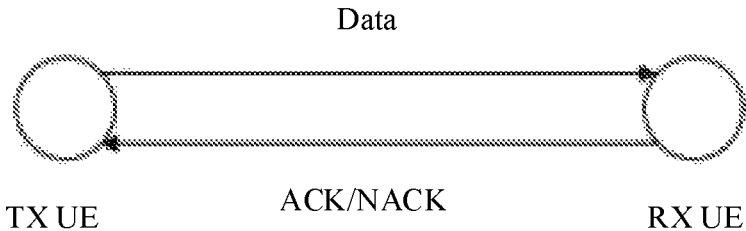
FIG. 6 is a schematic structural diagram of a network system based on HARQ feedback according to an embodiment of the present invention.

Sidelink transmission based on HARQ feedback helps improve reliability and effectiveness of transmission. For example, HARQ feedback may be introduced in NR V2X. As shown in FIG. 6, the transmit terminal (TX UE) sends data information (Data) to the receive terminal (RX UE), and the receive terminal determines whether the data is received successfully. If the data has been received successfully, the receive terminal feeds back an acknowledgement (ACK) to the transmit terminal; otherwise, the receive terminal feeds back a negative acknowledgment (NACK) to the transmit terminal.

Sidelink transmission supports unicast transmission, groupcast transmission, and broadcast transmission, where both unicast transmission and groupcast transmission need to support HARQ feedback. For example, for unicast transmission, the RX UE may feed back an ACK or NACK on a physical sidelink feedback channel (PSFCH). At the same time, the TX UE may perceive a discontinuous transmission (DTX) state. For example, for groupcast transmission, there are at least two feedback forms. First, all RX UEs share a PSFCH resource and feed back only NACKs, and the TX UE cannot perceive a DTX state in this case. Second, the RX UEs occupy different PSFCH resources, the RX UEs feed back an ACK or NACK on respective resources, and the TX UE is able to perceive the DTX state.

In this implementation, the receive terminal may perform HARQ feedback to the transmit terminal, the transmit terminal may determine, based on the feedback status of the receive terminal, whether the receive terminal can receive data successfully. If the receive terminal cannot receive data successfully, this is more likely caused by a resource conflict for the transmit terminal. In view of this, the transmit terminal may determine, based on the HARQ feedback status of the receive terminal, whether a resource conflict occurs, so as to determine whether the trigger condition of resource reselection is satisfied.

Optionally, in a case that at least one of the following conditions is satisfied, it is determined that the trigger condition for resource reselection is satisfied:

consecutive M DTXs or NACKs have been detected, where M is greater than or equal to a first threshold, or the total number of TBs corresponding to the consecutive M DTXs or NACKs is greater than or equal to a second threshold;

L DTXs or NACKs within a time window have been detected, where L is greater than or equal to a third threshold, or the total number of TBs corresponding to the L DTXs or NACKs within the time window is greater than or equal to a fourth threshold;

consecutive K DTXs or NACKs for initial transmission of TBs have been detected, where K is greater than or equal to a fifth threshold, or the total number of TBs corresponding to the consecutive K DTXs or NACKs for initial transmission of TBs is greater than or equal to a sixth threshold; and P DTXs or NACKs for initial transmission of TBs have been detected, where P is greater than or equal to a seventh threshold, or the total number of TBs corresponding to the P DTXs or NACKs for initial transmission of TBs is greater than or equal to an eighth threshold.

The time window may include parameters such as a starting position of the time window and a length of the time window, and the time window may be prescribed by the protocol, configured by the control node, or preconfigured.

In this implementation, a time point at which the transmit terminal detects a DTX or an NACK may be used as the starting position of the time window.

In this implementation, regardless of whether a DTX or an NACK is detected by the transmit terminal, it may indicate that the receive terminal cannot successfully receive data. The DTX or NACK being detected may be construed that either a DTX being detected or an NACK being detected belongs to the DTX or NACK being detected.

In the foregoing scenarios, the total number of DTXs or NACKs may be greater than or equal to a threshold prescribed by the protocol, or may be greater than or equal to a threshold configured by the control node, or may be greater than or equal to a preconfigured threshold; or, the total number of TBs corresponding to the DTXs or NACKs may be greater than or equal to a threshold prescribed by the protocol, or may be greater than or equal to a threshold configured by the control node, or may be greater than or equal to a preconfigured threshold. In other words, any one of the foregoing first threshold to the eighth threshold may be prescribed by the protocol, or may be configured by the control node, or may be preconfigured.

In this implementation, a larger value of the total number of DTXs or NACKs, or a larger value of the total number of TBs corresponding to DTXs or NACKs may indicate a greater impact resulting from a resource conflict of the transmit terminal. In order to ensure reliability and effectiveness of sidelink transmission, in a case that at least one of the foregoing conditions is satisfied, the transmit terminal may determine that the trigger condition for resource reselection is satisfied, and performs a resource reselection operation or a related adjustment operation.

In sidelink transmission, such as physical sidelink control channel (PSCCH) transmission or physical sidelink shared channel (PSSCH) transmission, the transmit terminal may reserve a transmission resource for next transmission (new transmission or retransmission), or may reserve a transmission resource for a plurality of transmissions. For example, the transmit terminal may reserve a transmission resource for the next TB transmission by using a "periodic reservation field" in sidelink control information (SL Control Information, SCI), or the transmit terminal may reserve a retransmission resource for a current TB transmission by using a "time domain resource indication field" in the SCI.

Optionally, the DTX includes at least one of the following:
a DTX transmitted on a periodically reserved resource;
a DTX transmitted on an aperiodically reserved resource; and
a DTX transmitted on a resource reserved by using same SCI;
or,
the NACK includes at least one of the following:
a NACK transmitted on a periodically reserved resource;
a NACK transmitted on an aperiodically reserved resource; and
a NACK transmitted on a resource reserved by using same SCI.

Figure 7:
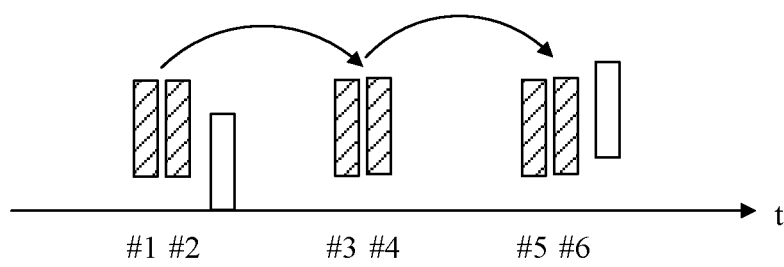
FIG. 7 is a schematic diagram of one type of resource continuity according to an embodiment of the present invention.

In this implementation, a plurality of consecutive DTXs or NACKs may be DTXs or NACKs transmitted on periodically reserved resources. For example, the periodically reserved resources may be resources reserved by using the "periodic reservation field", as shown in FIG. 7. In FIG. 7, all resources are resources of the transmit terminal, and the periodically reserved resources (indicated by slashed rectangles) are calculated as continuous resources, numbered "#1" to "#6".

The plurality of consecutive DTXs or NACKs may alternatively be DTXs or NACKs transmitted on aperiodically reserved resources, for example, the aperiodically reserved resources may be resources reserved by using the "time domain resource indication field".

Figure 8:
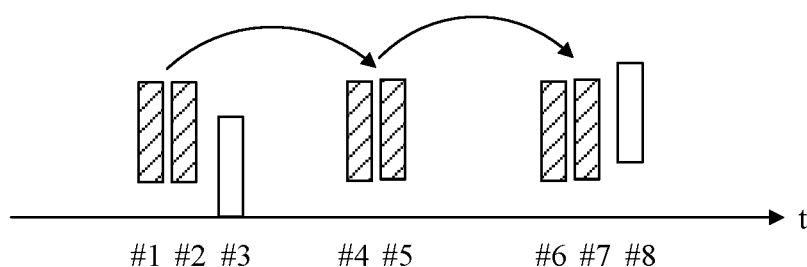
FIG. 8 is a schematic diagram of another type of resource continuity according to an embodiment of the present invention.

The plurality of consecutive DTXs or NACKs may alternatively include both DTXs or NACKs transmitted on periodically reserved resources and DTXs or NACKs transmitted on aperiodically reserved resources, as shown in FIG. 8. In FIG. 8, all resources are resources of the transmit terminal, and the periodically reserved resources (indicated by slashed rectangles) and the aperiodically reserved resources (indicated by blank rectangles) are calculated as continuous resources, numbered "#1" to "#8".

The plurality of consecutive DTXs or NACKs may alternatively be DTXs or NACKs transmitted on resources reserved by using same SCI.

Correspondingly, the plurality of DTXs or NACKs within the time window may be DTXs or NACKs transmitted on periodically reserved resources; or may be DTXs or NACKs transmitted on aperiodically reserved resources; or may include DTXs or NACKs transmitted on periodically reserved resources and also include DTXs or NACKs transmitted on the aperiodically reserved resources; or may be DTXs or NACKs transmitted on resources reserved by using same SCI.

In sidelink transmission based on HARQ feedback, a DTX detected by the transmit terminal may be caused by a resource conflict of the transmit terminal or caused by the receive terminal being located beyond the valid communication range. In view of this, in sidelink transmission based on HARQ feedback, in the case that the trigger condition for resource reselection is satisfied, the transmit terminal needs to further determine whether the receive terminal is located within the valid communication range, so as to exclude a factor that the receive terminal is located beyond the valid communication range. The corresponding optional implementations are as follows:
in a case of sidelink transmission based on HARQ feedback, the transmit terminal determines, based on a feedback status of the receive terminal, whether the trigger condition for resource reselection is satisfied;
in a case that the trigger condition for resource reselection is satisfied, determines whether the receive terminal is located within a valid communication range; and
performs the first operation in a case that the receive terminal is located within the valid communication range.

Optionally, in a case that at least one of the following conditions is satisfied, it is determined that the receive terminal is located within the valid communication range:
the transmit terminal has received reverse information from the receive terminal;
a distance between the transmit terminal and the receive terminal is less than or equal to a ninth threshold; and
an information transmission energy of the receive terminal is greater than or equal to a tenth threshold.

If the transmit terminal can receive reverse information transmission from the receive terminal, for example, PSCCH, PSSCH, or PSFCH transmission from the RX UE to the TX UE, it may indicate that the receive terminal is located within the valid communication range. If the distance between the transmit terminal and the receive terminal is less than or equal to the ninth threshold, and the ninth threshold may be prescribed by the protocol, configured by the control node, or preconfigured, it may indicate that the receive terminal is located within the valid communication range. If the information transmission energy of the receive terminal is greater than or equal to the tenth threshold, for example, a parameter such as a reference signal received power (RSRP), a received signal strength indicator received (RSSI), a reference signal received quality (RSRQ), or a signal to interference plus noise ratio (SINR), and the tenth threshold may be prescribed by the protocol, configured by the control node, or preconfigured, it may indicate that the receive terminal is located within the valid communication range. An RSRP, RSSI, RSRQ, or SINR value of the receive terminal may be reported by the receive terminal to the transmit terminal, or may be obtained through measurement by the transmit terminal.

In this implementation, in a case that the trigger condition for resource reselection is satisfied, the transmit terminal may further determine whether the receive terminal is located within the valid communication range, and the transmit terminal performs the first operation only when the transmit terminal determines that the receive terminal is located within the valid communication range.

In this implementation, whether the receive terminal is located within the valid communication range is determined, so as to determine whether the transmit terminal needs to perform the first operation. In a case that the receive terminal is located within the valid communication range, the transmit terminal may perform the first operation to resolve the problem that data transmission is affected by a resource conflict. The transmit terminal may not perform the first operation in a case that the receive terminal is located beyond the valid communication range.

The foregoing provides related descriptions of the implementation of determining whether the trigger condition for resource reselection is satisfied in sidelink transmission based on HARQ feedback.

The following describes an implementation in which the transmit terminal determines, based on a notification message sent by the receive terminal, whether the trigger condition for resource reselection is satisfied.

Optionally, in a case that the following condition is satisfied, it is determined that the trigger condition for resource reselection is satisfied:

the transmit terminal receives a first message sent by the receive terminal, where the first message includes at least one of resource conflict information and resource reselection trigger information.

In this implementation, when a message sent by the receive terminal includes resource conflict information or resource reselection trigger information, the transmit terminal may determine that the trigger condition for resource reselection is satisfied.

A bearing resource of the first message may include at least one of a PSCCH, a PSSCH, a PSFCH, and a first resource.

The first resource may include at least one frequency domain resource and at least one time domain resource, the frequency domain resource may include a sub-channel or a physical resource block (,PRB), and the time domain resource may include a slot or a sub-slot.

The bearing resource of the first message may be an independent PSCCH, such as a standalone PSCCH; the bearing resource of the first message may be a PSCCH associated with a PSSCH, such as 1st stage SCI in PSCCH; the bearing resource of the first message may be a PSSCH, for example, 2nd stage SCI in PSSCH, or a medium access control (MAC) control element (CE)/radio resource control (RRC) in PSSCH; or the bearing resource of the first message may be a PSFCH. The first resource may be a PSCCH formed by one (or more) sub-channel (or PRB) and one (or more) slot (or sub-slot), or may be a PSSCH formed by one (or more) sub-channel (or PRB) and one (or more) slot (or sub-slot).

Content of the first message may include at least one of the following:

an identifier of the resource reselection trigger information;

an identifier of the receive terminal;

an identifier of the transmit terminal;

position information of a conflict resource;

a type of the conflict resource, where the type of the resource includes a periodically reserved resource or an aperiodically reserved resource; and energy monitoring information.

The identifier of the resource reselection triggering information is used to indicate that the first message carries signaling for triggering the transmit terminal to perform resource reselection. The identifier of the transmit terminal may be an ID of a transmit terminal that needs to trigger resource reselection, or may be an ID of a transmit terminal with a resource conflict, and the identifier of the transmit terminal may be an ID corresponding to a broadcast transmission type. The position information of the conflict resource may include time domain information of the resource, and may also include frequency domain information of the resource. The energy detection information may include RSRP, RSRQ, RSSI, SNR, SINR, or the like, and the energy detection information may be obtained through measurement by the receive terminal from a plurality of transmit terminals.

In this implementation, the receive terminal may determine, based on a channel monitoring result, whether there is a resource conflict for the resource of the transmit terminal, and send the first message to the transmit terminal if there is a resource conflict for the resource of the transmit terminal. The following describes a plurality of optional implementation manners in which the receive terminal determines, based on a channel monitoring result, whether there is a resource conflict for the resource of the transmit terminal.

Manner 1: The receive terminal determines, based on resource reservation signaling of the transmit terminal, whether there is a resource conflict for the resource of the transmit terminal.

In this manner, the receive terminal may receive resource reservation signaling sent by the N transmit terminals, and the receive terminal determine, based on the resource reservation signaling of the N transmit terminals, whether there is a resource conflict for a resource of a first transmit terminal.

The N transmit terminals include the first transmit terminal, and N is greater than or equal to 1. Transmission between the N transmit terminals and the receive terminal may include any one of unicast transmission (for example, PC5-RRC connections are present between the receive terminal and the transmit terminals), groupcast transmission, and broadcast transmission.

In this manner, in a case that at least one of the following conditions is satisfied, it is determined that there is a resource conflict for the resource of the first transmit terminal:

resource reservation signaling of the first transmit terminal includes an overlapping resource;

an energy of resource reservation signaling of the first transmit terminal is greater than a first threshold;

an energy difference between the resource reservation signaling of the first transmit terminal and resource reservation signaling of a second transmit terminal is greater than a second threshold, and the N transmit terminals include the second transmit terminal; and an energy ratio of the resource reservation signaling of the first transmit terminal to resource reservation signaling of a third transmit terminal is greater than a third threshold, and the N transmit terminals include the third transmit terminal.

Any one of the foregoing first threshold to the third threshold may be prescribed by the protocol, or may be configured by the control node, or may be preconfigured. The energy may be expressed as a parameter, such as RSRP, RSSI, or RSRQ.

Manner 2: The receive terminal determines, based on a channel monitoring result (or a blind detection result), whether there is a resource conflict for the resource of the transmit terminal.

In this manner, the receive terminal may determine, based on a monitoring result of a first channel, whether there is a resource conflict for the resource of the first transmit terminal.

The first channel may include a PSCCH or a PSSCH.

In this manner, in a case that at least one of the following conditions is satisfied, it is determined that there is a resource conflict for the resource of the first transmit terminal:

no control information or data information of the first channel is detected;

an energy of a first resource on the first channel is greater than a fourth threshold, and the first resource is a resource, corresponding to the first transmit terminal, on the first channel; and a detected SINR or signal to noise ratio (SNR) of a second resource on the first channel is greater than a fifth threshold, and the second resource is a resource, corresponding to the first transmit terminal, on the first channel.

Any one of the foregoing fourth threshold and the fifth threshold may be prescribed by the protocol, or may be configured by the control node, or may be preconfigured. The energy may be expressed as a parameter, such as RSRP, RSSI, or RSRQ.

This manner is mostly applicable to a case in which the PSCCH can be successfully detected but the PSSCH cannot be successfully detected.

It should be noted that the receive terminal may alternatively combine the foregoing manners 1 and 2, so as to determine whether there is a resource conflict for the resource of the transmit terminal. To avoid repetition, details are not described herein again.

In this implementation, in a case that the receive terminal determines that there is a resource conflict for the resource of the first transmit terminal, the receive terminal may send the first message to the first transmit terminal. An occasion at which the receive terminal sends the first message to the first transmit terminal needs to conform to a delay limit predefined by the protocol, configured by the control node, or preconfigured. For example, the first transmit terminal sends the first message before M time domain units prior to the resource conflict; for another example, the receive terminal may send the first message to the first transmit terminal within L time domain units after the resource conflict is detected. The time domain unit in which the receive terminal sends the first message may be autonomously selected by the receive terminal.

M may be predefined by the protocol, configured by the control node, or preconfigured. In addition, a value range of M may also be predefined by the protocol, configured by the control node, or preconfigured; a maximum value of M may also be prescribed by the protocol, configured by the control node, or preconfigured; and a minimum value of M may also be prescribed by the protocol, configured by the control node, or preconfigured.

L may be predefined by the protocol, configured by the control node, or preconfigured. In addition, a value range of L may also be prescribed by the protocol, configured by the control node, or preconfigured; a maximum value of L may also be prescribed by the protocol, configured by the control node, or preconfigured; and a minimum value of L may also be prescribed by the protocol, configured by the control node, or preconfigured.

In addition, a target transmit terminal (that is, the first transmit terminal) to which the receive terminal sends the first message may be determined by the receive terminal, or may be determined by the receive terminal according to a rule that is predefined by the protocol, configured by the control node, or preconfigured.

The foregoing provides related descriptions of a plurality of optional implementations in which the receive terminal determines, based on a channel monitoring result, whether there is a resource conflict for the resource of the transmit terminal.

It should be noted that various optional implementations described in this embodiment of the present invention may be implemented in combination with each other or may be implemented independently, which is not limited in the embodiments of the present invention.

In this embodiment of the present invention, in sidelink communication, when there is a resource conflict for the resource of the transmit terminal, the transmit terminal may perform resource reselection or perform related adjustment in the case that the trigger condition for resource reselection is satisfied. In this way, the transmit terminal can address the problem of resource conflicts through resource reselection or related adjustment, thereby improving reliability and effectiveness of sidelink transmission and ensuring sidelink communication performance.

Figures 9, 10:
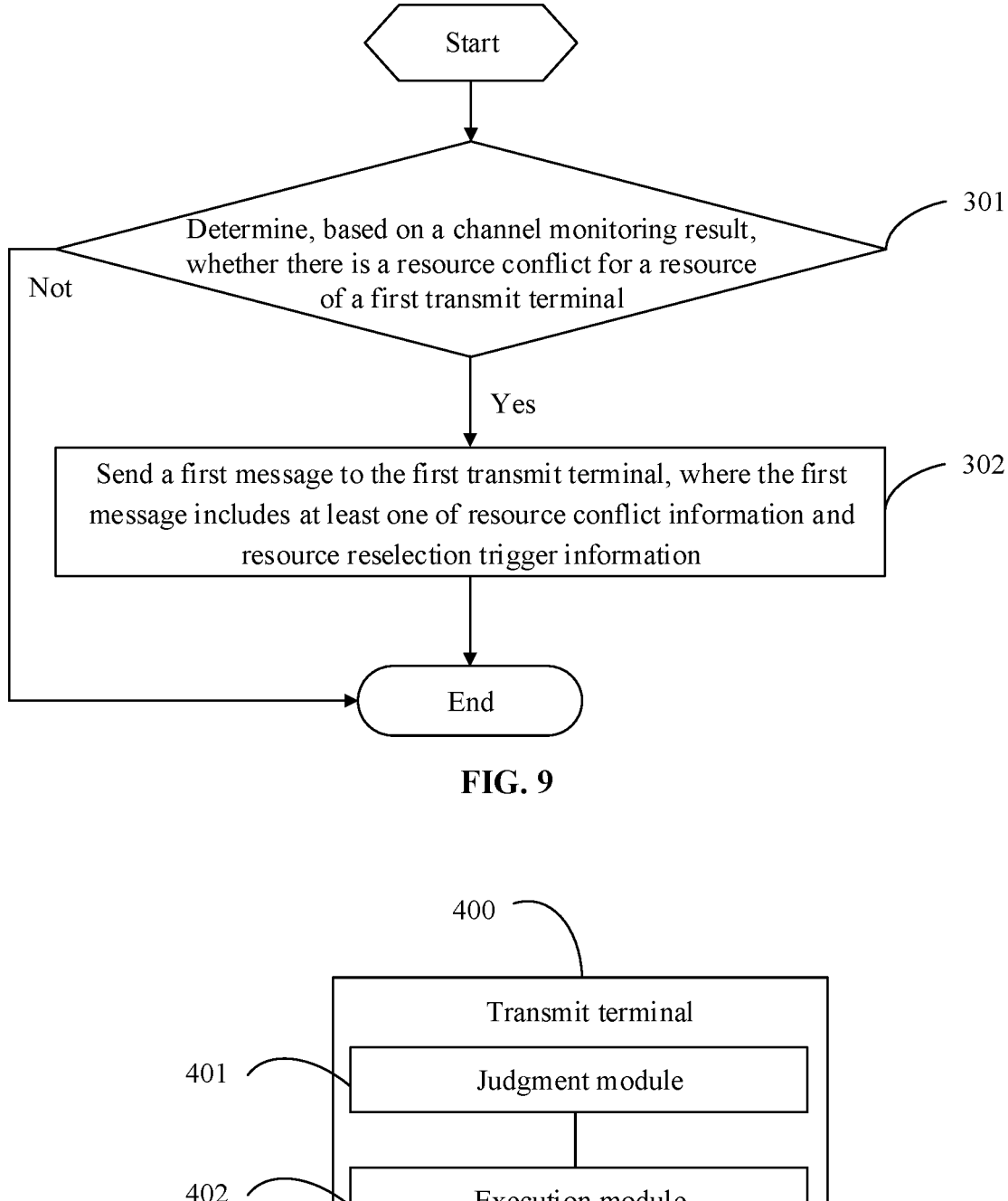
FIG. 9 is a flowchart of a sidelink transmission control method applied to a receive terminal according to an embodiment of the present invention.
FIG. 10 is a schematic structural diagram of a transmit terminal according to an embodiment of the present invention.

FIG. 9 is a flowchart of another sidelink transmission control method according to an embodiment of the present invention. As shown in FIG. 9, the sidelink transmission control method is applied to a receive terminal, and the method includes the following steps.

Step 301: Determine, based on a channel monitoring result, whether there is a resource conflict for a resource of a first transmit terminal.

Step 302: In a case that there is a resource conflict for the resource of the first transmit terminal, send a first message to the first transmit terminal, where the first message includes at least one of resource conflict information and resource reselection trigger information.

Optionally, the determining, based on a channel monitoring result, whether there is a resource conflict for a resource of a first transmit terminal includes:

receiving resource reservation signaling sent by N transmit terminals, where the N transmit terminals include the first transmit terminal, and N is greater than or equal to 1; and based on the resource reservation signaling of the N transmit terminals, determining whether there is a resource conflict for the resource of the first transmit terminal.

Optionally, transmission between the N transmit terminals and the receive terminal includes any one of unicast transmission, groupcast transmission, and broadcast transmission.

Optionally, in a case that at least one of the following conditions is satisfied, it is determined that there is a resource conflict for the resource of the first transmit terminal:

resource reservation signaling of the first transmit terminal includes an overlapping resource;

an energy of resource reservation signaling of the first transmit terminal is greater than a first threshold;

an energy difference between the resource reservation signaling of the first transmit terminal and resource reservation signaling of a second transmit terminal is greater than a second threshold, and the N transmit terminals include the second transmit terminal; and an energy ratio of the resource reservation signaling of the first transmit terminal to resource reservation signaling of a third transmit terminal is greater than a third threshold, and the N transmit terminals include the third transmit terminal.

Optionally, the determining, based on a channel monitoring result, whether there is a resource conflict for a resource of a first transmit terminal includes:

determine, based on a monitoring result of a first channel, whether there is a resource conflict for the resource of the first transmit terminal, where the first channel includes a physical sidelink control channel PSCCH or a physical sidelink shared channel PSSCH.

Optionally, in a case that at least one of the following conditions is satisfied, it is determined that there is a resource conflict for the resource of the first transmit terminal:

no control information or data information of the first channel is detected;

an energy of a first resource on the first channel is greater than a fourth threshold, and the first resource is a resource, corresponding to the first transmit terminal, on the first channel; and a detected signal to interference plus noise ratio SINK or signal to noise ratio SNR of a second resource on the first channel is greater than a fifth threshold, and the second resource is a resource, corresponding to the first transmit terminal, on the first channel.

Optionally, the sending a first message to a first transmit terminal includes:

sending the first message to the first transmit terminal before M time domain units prior to a conflict resource; or sending the first message to the first transmit terminal within L time domain units after a conflict resource.

Optionally, a bearing resource of the first message includes at least one of a PSCCH, a PSSCH, a PSFCH, and a first resource; the first resource includes at least one frequency domain resource and at least one time domain resource; the frequency domain resource includes a subchannel or a physical resource block PRB; and the time domain resource includes a slot or a sub-slot.

Optionally, content of the first message includes at least one of the following:

an identifier of the resource reselection trigger information;

an identifier of the receive terminal;

an identifier of the first transmit terminal;

position information of a conflict resource;

a type of the conflict resource, where the type of the resource includes a periodically reserved resource or an aperiodically reserved resource; and energy monitoring information.

It should be noted that for specific implementations of this embodiment of the present invention as an embodiment of the receive terminal corresponding to the embodiment shown in FIG. 1 to FIG. 8, reference may be made to the related descriptions about the embodiment shown in FIG. 1 to FIG. 8, with the same beneficial effects achieved. To avoid repetition, details are not described herein again.

FIG. 10 is a structural diagram of a transmit terminal according to an embodiment of the present invention. As shown in FIG. 10, the transmit terminal 400 includes:

a judgment module 401, configured to determine whether a trigger condition for resource reselection is satisfied; and an execution module 402, configured to perform a first operation in a case that the trigger condition for resource reselection is satisfied, where the first operation includes at least one of resource reselection, modulation and coding scheme MCS adjustment, and power adjustment.

Optionally, the judgment module 401 is specifically configured to:

if sidelink transmission is transmission of N transport blocks TBs based on hybrid automatic repeat request HARQ feedback, determining, based on a feedback from a receive terminal, whether the trigger condition for resource reselection is satisfied, where N is an integer greater than or equal to 1.

Optionally, in a case that at least one of the following conditions is satisfied, it is determined that the trigger condition for resource reselection is satisfied:

consecutive M discontinuous transmissions DTXs or negative acknowledgement NACKs have been detected, where M is greater than or equal to a first threshold, or the total number of TBs corresponding to the consecutive M DTXs or NACKs is greater than or equal to a second threshold;

L DTXs or NACKs within a time window have been detected, where L is greater than or equal to a third threshold, or the total number of TBs corresponding to the L DTXs or NACKs within the time window is greater than or equal to a fourth threshold;

consecutive K DTXs or NACKs for initial transmission of TBs have been detected, where K is greater than or equal to a fifth threshold, or the total number of TBs corresponding to the consecutive K DTXs or NACKs for initial transmission of TBs is greater than or equal to a sixth threshold; and P DTXs or NACKs for initial transmission of TBs have been detected, where P is greater than or equal to a seventh threshold, or the total number of TBs corresponding to the P DTXs or NACKs for initial transmission of TBs is greater than or equal to an eighth threshold.

Optionally, the DTX includes at least one of the following:

a DTX transmitted on a periodically reserved resource;

a DTX transmitted on an aperiodically reserved resource; and a DTX transmitted on a resource reserved by using same sidelink control information SCI;

or, the NACK includes at least one of the following:

a NACK transmitted on a periodically reserved resource;

a NACK transmitted on an aperiodically reserved resource; and a NACK transmitted on a resource reserved by using same SCI.

Optionally, the execution module 402 includes:

a judgment submodule, configured to: in a case that the trigger condition for resource reselection is satisfied, determine whether the receive terminal is located within a valid communication range; and an execution submodule, configured to perform the first operation in a case that the receive terminal is located within the valid communication range.

Optionally, in a case that at least one of the following conditions is satisfied, it is determined that the receive terminal is located within the valid communication range:

the transmit terminal has received reverse information from the receive terminal;

a distance between the transmit terminal and the receive terminal is less than or equal to a ninth threshold; and an information transmission energy of the receive terminal is greater than or equal to a tenth threshold.

Optionally, in a case that the following condition is satisfied, it is determined that the trigger condition for resource reselection is satisfied:

the transmit terminal receives a first message sent by the receive terminal, where the first message includes at least one of resource conflict information and resource reselection trigger information.

Optionally, a bearing resource of the first message includes at least one of a physical sidelink control channel PSCCH, a physical sidelink shared channel PSSCH, a physical sidelink feedback channel PSFCH, and a first resource; the first resource includes at least one frequency domain resource and at least one time domain resource; the frequency domain resource includes a sub-channel or a physical resource block PRB; and the time domain resource includes a slot or a sub-slot.

Optionally, content of the first message includes at least one of the following:

an identifier of the resource reselection trigger information;

an identifier of the receive terminal;

an identifier of the transmit terminal;

position information of a conflict resource;

a type of the conflict resource, where the type of the resource includes a periodically reserved resource or an aperiodically reserved resource; and energy monitoring information.

It should be noted that the transmit terminal 400 in this embodiment of the present invention may be a transmit terminal in any implementation of the method embodiments. Any implementation of the transmit terminal in the method embodiments can be implemented by the transmit terminal 400 in this embodiment of the present invention, and the same beneficial effect can be achieved. To avoid repetition, details are not described herein again.

Figure 11:
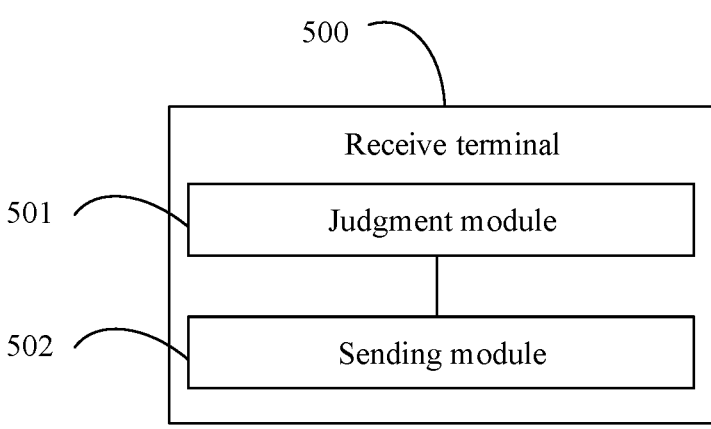
FIG. 11 is a schematic structural diagram of a receive terminal according to an embodiment of the present invention.

FIG. 11 is a structural diagram of a receive terminal according to an embodiment of the present invention. As shown in FIG. 11, the receive terminal 500 includes:

a judgment module 501, configured to determine, based on a channel monitoring result, whether there is a resource conflict for a resource of a first transmit terminal; and a sending module 502, configured to: in a case that there is a resource conflict for the resource of the first transmit terminal, send a first message to the first transmit terminal, where the first message includes at least one of resource conflict information and resource reselection trigger information.

Optionally, the judgment module 501 includes:

a receiving submodule, configured to receive resource reservation signaling sent by N transmit terminals, where the N transmit terminals include the first transmit terminal, and N is greater than or equal to 1; and a judgment submodule, configured to: based on the resource reservation signaling of the N transmit terminals, determine whether there is a resource conflict for the resource of the first transmit terminal.

Optionally, transmission between the N transmit terminals and the receive terminal includes any one of unicast transmission, groupcast transmission, and broadcast transmission.

Optionally, in a case that at least one of the following conditions is satisfied, it is determined that there is a resource conflict for the resource of the first transmit terminal:

resource reservation signaling of the first transmit terminal includes an overlapping resource;

an energy of resource reservation signaling of the first transmit terminal is greater than a first threshold;

an energy difference between the resource reservation signaling of the first transmit terminal and resource reservation signaling of a second transmit terminal is greater than a second threshold, and the N transmit terminals include the second transmit terminal; and an energy ratio of the resource reservation signaling of the first transmit terminal to resource reservation signaling of a third transmit terminal is greater than a third threshold, and the N transmit terminals include the third transmit terminal.

Optionally, the judgment module 501 is specifically configured to:

determine, based on a monitoring result of a first channel, whether there is a resource conflict for the resource of the first transmit terminal, where the first channel includes a physical sidelink control channel PSCCH or a physical sidelink shared channel PSSCH.

Optionally, in a case that at least one of the following conditions is satisfied, it is determined that there is a resource conflict for the resource of the first transmit terminal:

no control information or data information of the first channel is detected;

an energy of a first resource on the first channel is greater than a fourth threshold, and the first resource is a resource, corresponding to the first transmit terminal, on the first channel; and a detected signal to interference plus noise ratio SINR or signal to noise ratio SNR of a second resource on the first channel is greater than a fifth threshold, and the second resource is a resource, corresponding to the first transmit terminal, on the first channel.

Optionally, the sending a first message to a first transmit terminal includes:

sending the first message to the first transmit terminal before M time domain units prior to a conflict resource; or sending the first message to the first transmit terminal within L time domain units after a conflict resource.

Optionally, a bearing resource of the first message includes at least one of a PSCCH, a PSSCH, a physical sidelink feedback channel PSFCH, and a first resource; the first resource includes at least one frequency domain resource and at least one time domain resource; the frequency domain resource includes a sub-channel or a physical resource block PRB; and the time domain resource includes a slot or a sub-slot.

Optionally, content of the first message includes at least one of the following:

an identifier of the resource reselection trigger information;

an identifier of the receive terminal;

an identifier of the first transmit terminal;

position information of a conflict resource;

a type of the conflict resource, where the type of the resource includes a periodically reserved resource or an aperiodically reserved resource; and energy monitoring information.

It should be noted that the receive terminal 500 in the embodiments of the present invention may be a receive terminal in any implementation of the method embodiment. Any implementation of the receive terminal in the method embodiment can be implemented by the receive terminal 500 in the embodiments of the present invention, with the same beneficial effects achieved. To avoid repetition, details are not described herein again.

Figure 12:
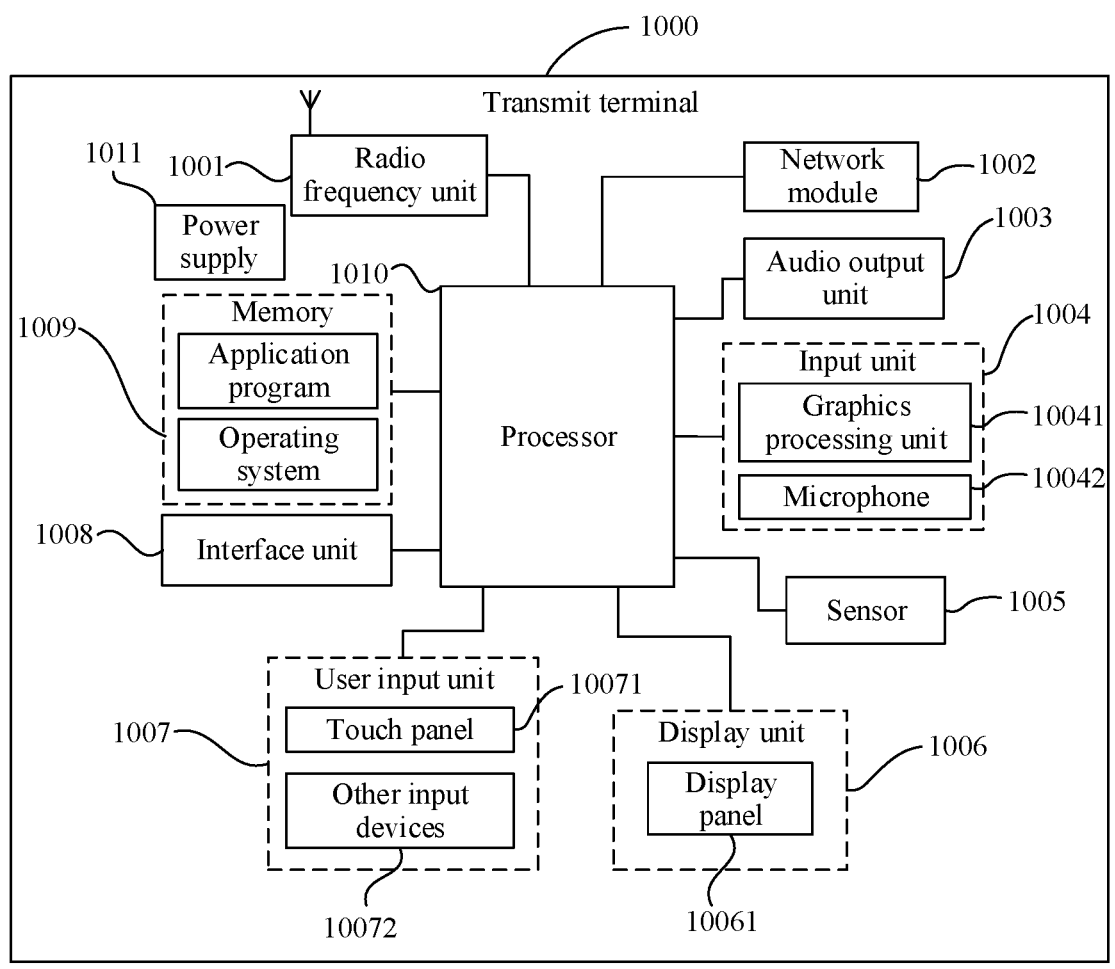
FIG. 12 is a schematic diagram of a hardware structure of a transmit terminal according to an embodiment of the present invention.

FIG. 12 is a schematic structural diagram of hardware of a transmit terminal for implementing the embodiments of the present invention. The transmit terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the structure of the transmit terminal shown in FIG. 12 does not constitute any limitation on the transmit terminal. The transmit terminal may include more or fewer components than those shown in the figure, or a combination of some components, or the components disposed differently. In this embodiment of the present invention, the transmit terminal includes, but is not limited to, a mobile phone, a tablet computer, a laptop computer, a personal digital assistant, an in-vehicle terminal, a wearable device, a pedometer, and the like.

The processor 1010 or the radio frequency unit 1001 is configured to:

determine whether a trigger condition for resource reselection is satisfied; and perform a first operation in a case that the trigger condition for resource reselection is satisfied, where the first operation includes at least one of resource reselection, modulation and coding scheme MCS adjustment, and power adjustment.

Optionally, the processor 1010 or the radio frequency unit 1001 is further configured to:

if sidelink transmission is transmission of N transport blocks TBs based on hybrid automatic repeat request HARQ feedback, determine, based on a feedback from a receive terminal, whether the trigger condition for resource reselection is satisfied, where N is an integer greater than or equal to 1.

Optionally, in a case that at least one of the following conditions is satisfied, it is determined that the trigger condition for resource reselection is satisfied:

consecutive M discontinuous transmissions DTXs or negative acknowledgement NACKs have been detected, where M is greater than or equal to a first threshold, or the total number of TBs corresponding to the consecutive M DTXs or NACKs is greater than or equal to a second threshold;

L DTXs or NACKs within a time window have been detected, where L is greater than or equal to a third threshold, or the total number of TBs corresponding to the L DTXs or NACKs within the time window is greater than or equal to a fourth threshold;

consecutive K DTXs or NACKs for initial transmission of TBs have been detected, where K is greater than or equal to a fifth threshold, or the total number of TBs corresponding to the consecutive K DTXs or NACKs for initial transmission of TBs is greater than or equal to a sixth threshold; and P DTXs or NACKs for initial transmission of TBs have been detected, where P is greater than or equal to a seventh threshold, or the total number of TBs corresponding to the P DTXs or NACKs for initial transmission of TBs is greater than or equal to an eighth threshold.

Optionally, the DTX includes at least one of the following:

a DTX transmitted on a periodically reserved resource;

a DTX transmitted on an aperiodically reserved resource; and a DTX transmitted on a resource reserved by using same sidelink control information SCI;

or, the NACK includes at least one of the following:

a NACK transmitted on a periodically reserved resource;

a NACK transmitted on an aperiodically reserved resource; and a NACK transmitted on a resource reserved by using same SCI.

Optionally, the processor 1010 or the radio frequency unit 1001 is further configured to:

in a case that the trigger condition for resource reselection is satisfied, determine whether the receive terminal is located within a valid communication range; and perform the first operation in a case that the receive terminal is located within the valid communication range.

Optionally, in a case that at least one of the following conditions is satisfied, it is determined that the receive terminal is located within the valid communication range:

the transmit terminal has received reverse information from the receive terminal;

a distance between the transmit terminal and the receive terminal is less than or equal to a ninth threshold; and an information transmission energy of the receive terminal is greater than or equal to a tenth threshold.

Optionally, in a case that the following condition is satisfied, it is determined that the trigger condition for resource reselection is satisfied:

the transmit terminal receives a first message sent by the receive terminal, where the first message includes at least one of resource conflict information and resource reselection trigger information.

Optionally, a bearing resource of the first message includes at least one of a physical sidelink control channel PSCCH, a physical sidelink shared channel PSSCH, a physical sidelink feedback channel PSFCH, and a first resource; the first resource includes at least one frequency domain resource and at least one time domain resource; the frequency domain resource includes a sub-channel or a physical resource block PRB; and the time domain resource includes a slot or a sub-slot.

Optionally, content of the first message includes at least one of the following:

an identifier of the resource reselection trigger information;

an identifier of the receive terminal;

an identifier of the transmit terminal;

position information of a conflict resource;

a type of the conflict resource, where the type of the resource includes a periodically reserved resource or an aperiodically reserved resource; and energy monitoring information.

In this embodiment of the present invention, in sidelink communication, when there is a resource conflict for the resource of the transmit terminal, the transmit terminal may perform resource reselection or perform related adjustment in the case that the trigger condition for resource reselection is satisfied. In this way, the transmit terminal can address the problem of resource conflicts through resource reselection or related adjustment, thereby improving reliability and effectiveness of sidelink transmission and ensuring sidelink communication performance.

It should be understood that in this embodiment of the present invention, the radio frequency unit 1001 may be configured to: receive and transmit signals in an information receiving/sending process or a call process; and specifically, after receiving downlink data from a base station, transmit the downlink information to the processor 1010 for processing, and in addition, transmit uplink data to the base station. Generally, the radio frequency unit 1001 includes but is not limited to an antenna, at least one amplifier, a transceiver, a coupler, a low noise amplifier, a duplexer, and the like. In addition, the radio frequency unit 1001 may also communicate with a network and other devices via a wireless communications system.

The transmit terminal provides the user with wireless broadband Internet access through the network module 1002, for example, helping the user to send and receive e-mails, browse web pages, and access streaming media.

The audio output unit 1003 may convert audio data received by the radio frequency unit 1001 or the network module 1002 or stored in the memory 1009 into an audio signal and output the audio signal as a sound. In addition, the audio output unit 1003 may further provide an audio output (for example, a call signal received sound or a message received sound) related to a specific function performed by the transmit terminal 1000. The audio output unit 1003 includes a speaker, a buzzer, a receiver, and the like.

The input unit 1004 is configured to receive an audio or video signal. The input unit 1004 may include a graphics processing unit (GPU) 10041 and a microphone 10042. The graphics processing unit 10041 processes image data of a still picture or a video obtained by an image capture apparatus (for example, a camera) in an image capture mode or a video capture mode. A processed image frame may be displayed on the display unit 1006. The image frame processed by the graphics processing unit 10041 may be stored in the memory 1009 (or another storage medium) or be transmitted by the radio frequency unit 1001 or the network module 1002. The microphone 10042 is capable of receiving sounds and processing such sounds into audio data. The processed audio data may be converted in a telephone call mode into a format that can be transmitted by the radio frequency unit 1001 to a mobile communications base station, for outputting.

The transmit terminal 1000 may further include at least one sensor 1005, for example, an optical sensor, a motion sensor, and another sensor. Specifically, the optical sensor may include an ambient light sensor and a proximity sensor. The ambient light sensor may adjust luminance of the display panel 10061 according to brightness of ambient light, and the proximity sensor may turn off the display panel 10061 and backlight when the transmit terminal 1000 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the transmit terminal, functions related to vibration recognition (such as pedometer and tapping), and the like. The sensor 1005 may also include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information input by the user or information provided to the user. The display unit 1006 may include a display panel 10061, and the display panel 10061 may be configured in a form of a liquid crystal display (LCD), an organic light-emitting diode (OLED), or the like.

The user input unit 1007 may be configured to: receive a digit or character information that is input, and generate signal input related to user settings and function control of the terminal. Specifically, the user input unit 1007 includes a touch panel 10071 and other input devices 10072. The touch panel 10071 is also referred to as a touchscreen and can collect a touch operation (such as an operation performed by the user on the touch panel 10071 or near the touch panel 10071 with a finger or by using any proper object or accessory such as a stylus) of the user on or near the touch panel 10071. The touch panel 10071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 1010, and can receive a command transmitted by the processor 1010 and execute the command. In addition, the touch panel 10071 may be implemented in a plurality of forms, for example, as a resistive, capacitive, infrared, or surface acoustic wave touch panel. The user input unit 1007 may further include the other input devices 10072 in addition to the touch panel 10071. Specifically, the other input devices 10072 may include but are not limited to a physical keyboard, a function key (such as a volume control key or an on/off key), a trackball, a mouse, and a joystick. Details are not described herein.

Further, the touch panel 10071 may cover the display panel 10061. When detecting a touch operation on or near the touch panel 10071, the touch panel 10071 transmits the touch operation to the processor 1010 to determine a type of a touch event. Then, the processor 1010 provides a corresponding visual output on the display panel 10061 based on the type of the touch event. In FIG. 11, the touch panel 10071 and the display panel 10061 serve as two independent components to implement input and output functions of the transmit terminal. In some embodiments, however, the touch panel 10071 may be integrated with the display panel 10061 to implement the input and output functions of the transmit terminal. This is not specifically limited herein.

The interface unit 1008 is an interface between an external apparatus and the transmit terminal 1000. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1008 may be configured to receive an input (for example, data information or power) from an external apparatus, and transmit the received input to one or more components in the transmit terminal 1000, or may be configured to transmit data between the transmit terminal 1000 and an external apparatus.

The memory 1009 may be configured to store software programs and various data. The memory 1009 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 1009 may include a high-speed random access memory, and may further include a non-volatile memory such as at least one disk storage device, a flash memory device, or another volatile solid-state storage device.

The processor 1010 is a control center of the transmit terminal, and is connected to all components of the transmit terminal by using various interfaces and lines. By running or executing a software program and/or module that is stored in the memory 1009 and calling data stored in the memory 1009, the processor 1010 executes various functions of the transmit terminal and processes data, so as to perform overall monitoring on the transmit terminal. The processor 1010 may include one or more processing units. Preferably, the processor 1010 may integrate an application processor and a modem processor. The application processor mainly processes the operating system, a user interface, an application program, and the like. The modem processor mainly processes wireless communication. It can be understood that the modem processor may alternatively be not integrated in the processor 1010.

The transmit terminal 1000 may further include a power supply 1011 (such as a battery) that supplies power to components. Optionally, the power supply 1011 may be logically connected to the processor 1010 through a power management system. In this way, functions such as charge management, discharge management, and power consumption management are implemented by using the power management system.

In addition, the transmit terminal 1000 includes some functional modules that are not illustrated. Details are not described herein.

Preferably, an embodiment of the present invention further provides a transmit terminal, including a processor 1010, a memory 1009, and a computer program stored in the memory 1009 and capable of running on the processor 1010. When the computer program is executed by the processor 1010, the processes of the embodiment of the foregoing sidelink transmission control method can be implemented, with same technical effects achieved. To avoid repetition, details are not described herein again.

It should be noted that the transmit terminal 1000 in this embodiment may be the transmit terminal in any implementation of the method embodiment of the embodiments of the present invention, and any implementation of the transmit terminal in the method embodiment of the embodiments of the present invention may be implemented by the transmit terminal 1000 in this embodiment, with the same beneficial effects achieved. Details are not described herein again.

Figure 13:
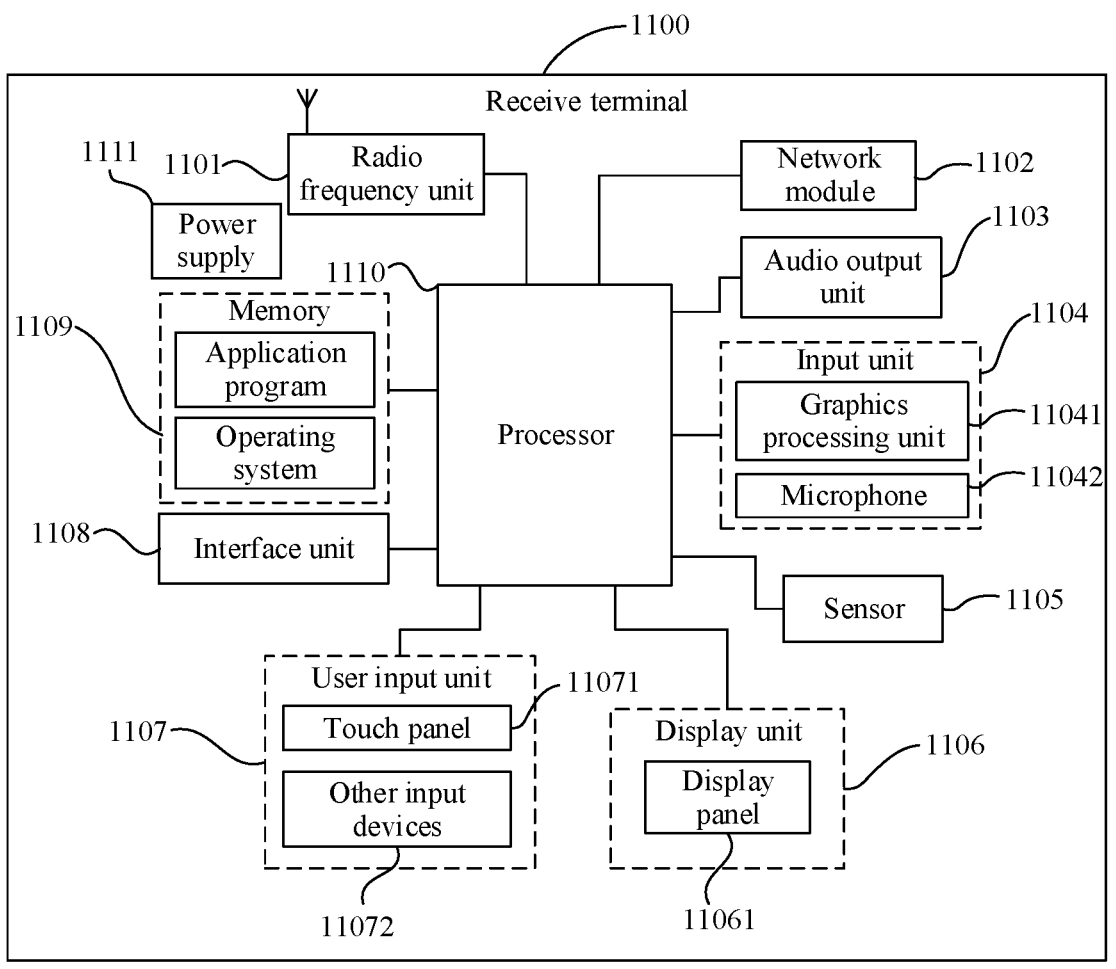
FIG. 13 is a schematic diagram of a hardware structure of a receive terminal according to an embodiment of the present invention.

FIG. 13 is a schematic structural diagram of hardware of a receive terminal for implementing the embodiments of the present invention. The receive terminal 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. A person skilled in the art may understand that the structure of the receive terminal shown in FIG. 11 does not constitute any limitation on the receive terminal. The receive terminal may include more or fewer components than those shown in the figure, or a combination of some components, or the components disposed differently. In this embodiment of the present invention, the receive terminal includes, but is not limited to, a mobile phone, a tablet computer, a laptop computer, a personal digital assistant, an in-vehicle terminal, a wearable device, a pedometer, and the like.

The processor 1110 or the radio frequency unit 1101 is configured to:

determine, based on a channel monitoring result, whether there is a resource conflict for a resource of a first transmit terminal; and in a case that there is a resource conflict for the resource of the first transmit terminal, send a first message to the first transmit terminal, where the first message includes at least one of resource conflict information and resource reselection trigger information.

Optionally, the processor 1110 or the radio frequency unit 1101 is further configured to:

receive resource reservation signaling sent by N transmit terminals, where the N transmit terminals include the first transmit terminal, and N is greater than or equal to 1; and based on the resource reservation signaling of the N transmit terminals, determine whether there is a resource conflict for the resource of the first transmit terminal.

Optionally, transmission between the N transmit terminals and the receive terminal includes any one of unicast transmission, groupcast transmission, and broadcast transmission.

Optionally, in a case that at least one of the following conditions is satisfied, it is determined that there is a resource conflict for the resource of the first transmit terminal:

resource reservation signaling of the first transmit terminal includes an overlapping resource;

an energy of resource reservation signaling of the first transmit terminal is greater than a first threshold;

an energy difference between the resource reservation signaling of the first transmit terminal and resource reservation signaling of a second transmit terminal is greater than a second threshold, and the N transmit terminals include the second transmit terminal; and an energy ratio of the resource reservation signaling of the first transmit terminal to resource reservation signaling of a third transmit terminal is greater than a third threshold, and the N transmit terminals include the third transmit terminal.

Optionally, the processor 1110 or the radio frequency unit 1101 is further configured to:

determine, based on a monitoring result of a first channel, whether there is a resource conflict for the resource of the first transmit terminal, where the first channel includes a physical sidelink control channel PSCCH or a physical sidelink shared channel PSSCH.

Optionally, in a case that at least one of the following conditions is satisfied, it is determined that there is a resource conflict for the resource of the first transmit terminal:

no control information or data information of the first channel is detected;

an energy of a first resource on the first channel is greater than a fourth threshold, and the first resource is a resource, corresponding to the first transmit terminal, on the first channel; and a detected signal to interference plus noise ratio SINK or signal to noise ratio SNR of a second resource on the first channel is greater than a fifth threshold, and the second resource is a resource, corresponding to the first transmit terminal, on the first channel.

Optionally, the sending a first message to a first transmit terminal includes:

sending the first message to the first transmit terminal before M time domain units prior to a conflict resource; or sending the first message to the first transmit terminal within L time domain units after a conflict resource.

Optionally, a bearing resource of the first message includes at least one of a PSCCH, a PSSCH, a physical sidelink feedback channel PSFCH, and a first resource; the first resource includes at least one frequency domain resource and at least one time domain resource; the frequency domain resource includes a sub-channel or a physical resource block PRB; and the time domain resource includes a slot or a sub-slot.

Optionally, content of the first message includes at least one of the following:

an identifier of the resource reselection trigger information;

an identifier of the receive terminal;

an identifier of the first transmit terminal;

position information of a conflict resource;

a type of the conflict resource, where the type of the resource includes a periodically reserved resource or an aperiodically reserved resource; and energy monitoring information.

In the embodiments of the present invention, in sidelink communication, when there is a resource conflict for the resource of the first transmit terminal, the first transmit terminal may perform resource reselection or perform related adjustment in the case that the trigger condition for resource reselection is satisfied. In this way, the first transmit terminal can address the problem of resource conflicts through resource reselection or related adjustment, thereby improving reliability and effectiveness of sidelink transmission and ensuring sidelink communication performance.

It should be understood that in this embodiment of the present invention, the radio frequency unit 1101 may be configured to: receive and transmit signals in an information receiving/sending process or a call process; and specifically, after receiving downlink data from a base station, transmit the downlink information to the processor 1110 for processing, and in addition, transmit uplink data to the base station. Generally, the radio frequency unit 1101 includes but is not limited to an antenna, at least one amplifier, a transceiver, a coupler, a low noise amplifier, a duplexer, and the like. In addition, the radio frequency unit 1101 may also communicate with a network and other devices via a wireless communications system.

The receive terminal provides a user with wireless broadband internet access through the network module 1102, for example, helping the user to send and receive e-mails, browse web pages, and access streaming media.

The audio output unit 1103 may convert audio data received by the radio frequency unit 1101 or the network module 1102 or stored in the memory 1109 into an audio signal and output the audio signal as a sound. In addition, the audio output unit 1103 may further provide audio output (for example, a call signal received sound or a message received sound) related to a specific function performed by the receive terminal 1100. The audio output unit 1103 includes a speaker, a buzzer, a receiver, and the like.

The input unit 1104 is configured to receive an audio or video signal. The input unit 1104 may include a graphics processing unit (GPU) 11041 and a microphone 11042. The graphics processing unit 11041 processes image data of a still picture or a video obtained by an image capture apparatus (for example, a camera) in an image capture mode or a video capture mode. A processed image frame may be displayed on the display unit 1106. The image frame processed by the graphics processing unit 11041 may be stored in the memory 1109 (or another storage medium) or be transmitted by the radio frequency unit 1101 or the network module 1102. The microphone 11042 is capable of receiving sounds and processing such sounds into audio data. The processed audio data may be converted in a telephone call mode into a format that can be transmitted by the radio frequency unit 1101 to a mobile communications base station, for outputting.

The receive terminal 1100 may further include at least one sensor 1105, for example, an optical sensor, a motion sensor, and another sensor. Specifically, the optical sensor may include an ambient light sensor and a proximity sensor. The ambient light sensor may adjust luminance of the display panel 11061 according to brightness of ambient light, and the proximity sensor may turn off the display panel 11061 and backlight when the receive terminal 1100 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the receive terminal, functions related to vibration recognition (such as pedometer and tapping), and the like. The sensor 1105 may also include a fingerprint sensor, a pressure sensor, an iris sensor, a molecular sensor, a gyroscope, a barometer, a hygrometer, a thermometer, an infrared sensor, and the like. Details are not described herein.

The display unit 1106 is configured to display information input by the user or information provided to the user. The display unit 1106 may include a display panel 11061, and the display panel 11061 may be configured in a form of a liquid crystal display (LCD), an organic light-emitting diode (OLED), or the like.

The user input unit 1107 may be configured to: receive a digit or character information that is input, and generate signal input related to user settings and function control of the receive terminal. Specifically, the user input unit 1107 may include a touch panel 11071 and other input devices 11072. The touch panel 11071 is also referred to as a touchscreen and can collect a touch operation (such as an operation performed by the user on the touch panel 11071 or near the touch panel 11071 with a finger or by using any proper object or accessory such as a stylus) of the user on or near the touch panel 10071. The touch panel 11071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 1110, and can receive a command transmitted by the processor 1110 and execute the command. In addition, the touch panel 11071 may be implemented in a plurality of forms, for example, as a resistive, capacitive, infrared, or surface acoustic wave touch panel. The user input unit 1107 may further include the other input devices 11072 in addition to the touch panel 11071. Specifically, the other input devices 11072 may include but are not limited to a physical keyboard, a function key (such as a volume control key or an on/off key), a trackball, a mouse, and a joystick. Details are not described herein.

Further, the touch panel 11071 may cover the display panel 11061. When detecting a touch operation on or near the touch panel 11071, the touch panel 11071 transmits the touch operation to the processor 1110 to determine a type of a touch event. Then, the processor 1110 provides a corresponding visual output on the display panel 11061 based on the type of the touch event. Although in FIG. 11, the touch panel 11071 and the display panel 11061 act as two independent parts to implement input and output functions of the receive terminal, in some embodiments, the touch panel 11071 and the display panel 11061 may be integrated to implement the input and output functions of the receive terminal. This is not specifically limited herein.

The interface unit 1108 is an interface between an external apparatus and the receive terminal 1100. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1108 may be configured to receive an input (for example, data information or power) from an external apparatus and transmit the received input to one or more components in the receive terminal 1100, or may be configured to transmit data between the receive terminal 1100 and an external apparatus.

The memory 1109 may be configured to store software programs and various data. The memory 1109 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 1109 may include a high-speed random access memory, and may further include a non-volatile memory such as at least one disk storage device, a flash memory device, or another volatile solid-state storage device.

The processor 1110 is a control center of the receive terminal, and is connected to all components of the receive terminal by using various interfaces and lines. By running or executing a software program and/or module that is stored in the memory 1109 and calling data stored in the memory 1109, the processor 1110 executes various functions of the receive terminal and processes data, so as to perform overall monitoring on the receive terminal. The processor 1110 may include one or more processing units. Preferably, the processor 1110 may integrate an application processor and a modem processor. The application processor mainly processes the operating system, a user interface, an application program, and the like. The modem processor mainly processes wireless communication. It can be understood that the modem processor may alternatively be not integrated in the processor 1110.

The receive terminal 1100 may further include a power supply 1111 (such as a battery) that supplies power to components. Preferably, the power supply 1111 may be logically connected to the processor 1110 through a power management system. In this way, functions such as charge management, discharge management, and power consumption management are implemented by using the power management system.

In addition, the receive terminal 1100 includes some functional modules that are not shown. Details are not described herein.

Preferably, an embodiment of the present invention further provides a receive terminal, including a processor 1110, a memory 1109, and a computer program stored in the memory 1109 and capable of running on the processor 1110. When the computer program is executed by the processor 1110, the processes of the embodiment of the foregoing sidelink transmission control method can be implemented, with same technical effects achieved. To avoid repetition, details are not described herein again.

It should be noted that the receive terminal 1100 in this embodiment may be the receive terminal in any implementation of the method embodiment of the embodiments of the present invention, and any implementation of the receive terminal in the method embodiment of the embodiments of the present invention may be implemented by the receive terminal 1100 in this embodiment, with the same beneficial effects achieved. Details are not described herein again.

An embodiment of the present invention further provides a computer-readable storage medium, where a computer program is stored in the computer-readable storage medium. When the computer program is executed by a processor, the processes of the foregoing embodiment corresponding to the receive terminal or the network side can be implemented, with same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a transmit terminal (which may be a mobile phone, a computer, a server, an air conditioner, a network device, or the like) to perform the methods described in the embodiments of the present invention.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The foregoing storage medium may be a magnetic disk, an optical disc, a read-only memory (ROM), a random access memory (RAM), or the like.

It can be understood that the embodiments described in this disclosure may be implemented by hardware, software, firmware, middleware, microcode, or a combination thereof.

For hardware implementation, a module, a unit, a sub-unit, a sub-module, and the like may be implemented in one or more application specific integrated circuits (ASIC), digital signal processors (,DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention is subject to the protection scope of the claims.

What is claimed is:

1. A sidelink transmission control method, performed by a receive terminal and comprising:

determining, based on a channel monitoring result, whether there is a resource conflict between a resource of a first transmit terminal in N transmit terminals and a resource of another transmit terminal in the N transmit terminals, N being an integer greater than 1; and in accordance with a determination that there is the resource conflict between the resource of the first transmit terminal and the resource of the other transmit terminal, sending a first message to the first transmit terminal, wherein the first message comprises resource conflict information.

2. The method according to claim 1, wherein the determining, based on the channel monitoring result, whether there is the resource conflict comprises:

receiving resource reservation signaling sent by the N transmit terminals; and based on the resource reservation signaling of the N transmit terminals, determining whether there is the resource conflict between the resource of the first transmit terminal and the resource of the other transmit terminal.

3. The method according to claim 2, wherein transmission between the N transmit terminals and the receive terminal comprises any one of unicast transmission, groupcast transmission, and broadcast transmission.

4. The method according to claim 2, wherein in a case that at least one of the following conditions is satisfied, it is determined that there is the resource conflict:

resource reservation signaling of the first transmit terminal comprises an overlapping resource;

an energy of resource reservation signaling of the first transmit terminal is greater than a first threshold;

an energy difference between the resource reservation signaling of the first transmit terminal and resource reservation signaling of a second transmit terminal is greater than a second threshold, and the N transmit terminals comprise the second transmit terminal; and an energy ratio of the resource reservation signaling of the first transmit terminal to resource reservation signaling of a third transmit terminal is greater than a third threshold, and the N transmit terminals comprise the third transmit terminal.

5. The method according to claim 1, wherein the determining, based on the channel monitoring result, whether there is the resource conflict comprises:
  determining, based on a monitoring result of a first channel, whether there is the resource conflict, wherein the first channel comprises a physical sidelink control channel (PSCCH) or a physical sidelink shared channel (PSSCH).

6. The method according to claim 5, wherein in a case that at least one of the following conditions is satisfied, it is determined that there is the resource conflict:
  no control information or data information of the first channel is detected;
  an energy of a first resource on the first channel is greater than a fourth threshold, and the first resource is a resource, corresponding to the first transmit terminal, on the first channel; and
  a detected signal to interference plus noise ratio SINR or signal to noise ratio SNR of a second resource on the first channel is greater than a fifth threshold, and the second resource is a resource, corresponding to the first transmit terminal, on the first channel.

7. The method according to claim 1, wherein the sending a first message to the first transmit terminal comprises:
  sending the first message to the first transmit terminal before M time domain units prior to a conflict resource; or
  sending the first message to the first transmit terminal within L time domain units after a conflict resource.

8. The method according to claim 1, wherein a bearing resource of the first message comprises at least one of a PSCCH, a PSSCH, a physical sidelink feedback channel (PSFCH), and a first resource; the first resource comprises at least one frequency domain resource and at least one time domain resource; the frequency domain resource comprises a sub-channel or a physical resource block PRB; and time domain resource comprises a slot or a sub-slot.

9. The method according to claim 1, wherein content of the first message comprises at least one of the following:
  an identifier of resource reselection trigger information;
  an identifier of the receive terminal;
  an identifier of the first transmit terminal;
  position information of a conflict resource;
  a type of the conflict resource, wherein the type of the resource comprises a periodically reserved resource or an aperiodically reserved resource; and
  energy monitoring information.

10. A transmit terminal, comprising a memory, a processor, and a computer program stored in the memory and capable of running on the processor, wherein when the computer program is executed by the processor, the following steps are implemented:
  determining whether a trigger condition for resource reselection is satisfied; and
  performing a first operation in a case that the trigger condition for resource reselection is satisfied, wherein the first operation comprises at least one of resource reselection, modulation and coding scheme (MCS) adjustment, and power adjustment;
  wherein in a case that the following condition is satisfied, it is determined that the trigger condition for resource reselection is satisfied:
  the transmit terminal receives a first message sent by a receive terminal, wherein the first message comprises resource conflict information for a resource conflict between a resource of the transmit terminal in N transmit terminals and a resource of another transmit terminal in the N transmit terminals, N being an integer greater than 1;
  wherein the first message is sent in accordance with a determination, which is performed based on a channel monitoring result, that there is the resource conflict between the resource of the transmit terminal in the N transmit terminals and the resource of the other transmit terminal in the N transmit terminals.

11. The transmit terminal according to claim 10, wherein the step of determining whether a trigger condition for resource reselection is satisfied comprises:
  in a case that sidelink transmission is transmission of N transport blocks (TBs) based on hybrid automatic repeat request (HARQ) feedback, determining, based on a feedback from the receive terminal, whether the trigger condition for resource reselection is satisfied, wherein N is an integer greater than or equal to 1.

12. A receive terminal, comprising a memory, a processor, and a computer program stored in the memory and capable of running on the processor, wherein when the computer program is executed by the processor, the following steps are implemented:
  determining, based on a channel monitoring result, whether there is a resource conflict between a resource of a first transmit terminal in N transmit terminals and a resource of another transmit terminal in the N transmit terminals, N being an integer greater than 1; and
  in accordance with a determination that there is the resource conflict between the resource and the resource of the other transmit terminal, sending a first message to the first transmit terminal, wherein the first message comprises resource conflict information.

13. The receive terminal according to claim 12, wherein the step of determining, based on the channel monitoring result, whether there is the resource conflict comprises:
  receiving resource reservation signaling sent by the N transmit terminals; and
  based on the resource reservation signaling of the N transmit terminals, determining whether there is the resource conflict between the resource and the resource of the other transmit terminal.

14. The receive terminal according to claim 13, wherein transmission between the N transmit terminals and the receive terminal comprises any one of unicast transmission, groupcast transmission, and broadcast transmission.

15. The receive terminal according to claim 13, wherein in a case that at least one of the following conditions is satisfied, it is determined that there is the resource conflict:
  resource reservation signaling of the first transmit terminal comprises an overlapping resource;
  an energy of resource reservation signaling of the first transmit terminal is greater than a first threshold;
  an energy difference between the resource reservation signaling of the first transmit terminal and resource reservation signaling of a second transmit terminal is greater than a second threshold, and the N transmit terminals comprise the second transmit terminal; and
  an energy ratio of the resource reservation signaling of the first transmit terminal to resource reservation signaling of a third transmit terminal is greater than a third threshold, and the N transmit terminals comprise the third transmit terminal.

16. The receive terminal according to claim 12, wherein the step of determining, based on the channel monitoring result, whether there is the resource conflict comprises:

determining, based on a monitoring result of a first channel, whether there is the resource conflict, wherein the first channel comprises a physical sidelink control channel (PSCCH) or a physical sidelink shared channel (PSSCH).

17. The receive terminal according to claim 16, wherein in a case that at least one of the following conditions is satisfied, it is determined that there is the resource conflict:

no control information or data information of the first channel is detected;

an energy of a first resource on the first channel is greater than a fourth threshold, and the first resource is a resource, corresponding to the first transmit terminal, on the first channel; and a detected signal to interference plus noise ratio SINR or signal to noise ratio SNR of a second resource on the first channel is greater than a fifth threshold, and the second resource is a resource, corresponding to the first transmit terminal, on the first channel.

18. The receive terminal according to claim 12, wherein the step of sending a first message to the first transmit terminal comprises:

sending the first message to the first transmit terminal before M time domain units prior to a conflict resource; or sending the first message to the first transmit terminal within L time domain units after a conflict resource.

19. The receive terminal according to claim 12, wherein a bearing resource of the first message comprises at least one of a PSCCH, a PSSCH, a physical sidelink feedback channel (PSFCH), and a first resource; the first resource comprises at least one frequency domain resource and at least one time domain resource; the frequency domain resource comprises a sub-channel or a physical resource block PRB; and the time domain resource comprises a slot or a sub-slot.

* * * * *